Patented Nov. 11, 1924.

1,515,108

UNITED STATES PATENT OFFICE.

FREDERICK W. GRAFF, OF CHICAGO, ILLINOIS.

GRAIN PRODUCT AND PROCESS OF MANUFACTURE.

No Drawing.   Application filed May 28, 1923. Serial No. 642,093.

*To all whom it may concern:*

Be it known that I, FREDERICK W. GRAFF, a citizen of the United States, residing in the city of Chicago, Cook County, and State of Illinois, have invented certain new and useful Improvements in Grain Products and Processes of Manufacture.

The invention relates to a novel process producing by the removal of the water from the solution of soluble components of grains and grain products such as malts, for instance, dried matter of a non-hygroscopical nature.

It is a well known fact that such products resulting from the extraction of grain or particularly malted grains, when the water is removed by any suitable drying process, the resulting dried products are of an extremely hygroscopic nature. When left open to the influence of the moisture contained in air, these products absorb this moisture so quickly that they lose their powdered form and solidify into a cake.

It is the object, therefore, of the present invention to provide means for reducing the tendency of such products to absorb water.

A further object is to provide means for treating the solution of such products so that no further treatment after the drying step is necessary to make the products non-hygroscopic.

I have found that these results may be obtained by adding to these grain or malted extracts, before drying, substances which when dried with them form a protecting film around the particles, thus preventing the moisture in the air to be absorbed by the dried extracts. There are various substances which may be used for this purpose. I have found, for instance, a very suitable medium in hops on account of the soluble resinous matter contained in it. I, however, do not confine myself to the use of hops exclusively, but may make use of other suitable material.

In the preferred method of carrying out the invention, I proceed as follows:

Grains or malted grains are extracted in the usual way by means of hot water of certain temperatures, preferably in such a way as to procure all of the available solids in solution. With malted grains, the proceedings in use in the brewing industry, for instance, may be followed. These processes are well known and do not need any particular description. After the soluble matters in grain and the converted matter in malts such as maltose, dextrin and albumens are brought into solution, the solutions are boiled with a small percentage of hops for an hour or two in order to get the soluble resin contained in the hops in solution. The percentage of hops may vary according to the purpose for which the products shall be used. For example, the quantity of hops used may conveniently vary from ½% up to 4% on the dry weights of the materials in solution in the hops and in the grain extract. The insoluble part of the hops, such as leaves, etc. is removed from the solution by well known means such as straining for instance, and the solution is preferably cooled to a temperature as low as possible, that is, to 40° F. or less in order to precipitate such albuminous matters and hop resins which are insoluble at this temperature. The solution is then filtered in order to remove the insoluble parts from it in any suitable way.

The clear solution is reduced to dryness by any suitable means, preferably, however, by spraying it into a current of hot air into a drying chamber. The drying should be done in such a way that the resulting powder contains not more than from 3 to 6% moisture. This powder, whose taste is rather improved by the addition of a small amount of hop resins contained in it, is non, or only very slightly, hygroscopic and can be used in place of malt extracts for instance for all purposes, mainly in addition to flour in the products of the baking industry or for any other purpose where grain or malt extracts are employed.

Other materials than hops may, if desired, be used to bring out the desired result. Thus I may use gelatine or such reinous salts as sodium resinate, although the last mentioned substance is not as satisfactory as hops or gelatine if the final product is to be used directly as food. Grain extracts are acid, so that as a rule alkaline protective materials cannot be used.

It is also possible to produce a non-hygroscopic product by arranging a paraffin spray below the spray of grain extract so that the dry particles of the latter become coated and impregnated with paraffin in the drying chamber.

I claim as my invention:

1. The process of rendering hygroscopical substances such as those resulting from the drying of extracts of grain and grain products such as malts, non-hygroscopical by the addition of materials such as resins derived from hops which are able to form a protecting film over the extracts of grain and grain products when dried.

2. A product obtained by the drying of a mixture of extracts of grain and grain products and of soluble substances such as resins from hops.

In testimony whereof I have hereunto subscribed my name in the presence of two subscribing witnesses.

FREDERICK W. GRAFF.

Witnesses:
 RIDSDALE ELLIS,
 OSCAR HARTMANN.